US009156201B2

(12) United States Patent
Schneider

(10) Patent No.: US 9,156,201 B2
(45) Date of Patent: Oct. 13, 2015

(54) SINGLE SCREW EXTRUDER

(75) Inventor: Florian Johannes Schneider, Germering (DE)

(73) Assignee: KRAUSSMAFFEI TECHNOLOGIES GmbH, München (DE)

( * ) Notice: Subject to any disclaimer, the term of this patent is extended or adjusted under 35 U.S.C. 154(b) by 1190 days.

(21) Appl. No.: 13/058,637

(22) PCT Filed: Jul. 7, 2009

(86) PCT No.: PCT/EP2009/058612
§ 371 (c)(1),
(2), (4) Date: Feb. 11, 2011

(87) PCT Pub. No.: WO2010/020467
PCT Pub. Date: Feb. 25, 2010

(65) Prior Publication Data
US 2011/0158034 A1 Jun. 30, 2011

(30) Foreign Application Priority Data
Aug. 20, 2008 (DE) .......................... 10 2008 038 529

(51) Int. Cl.
*B29C 47/38* (2006.01)
*B29C 47/66* (2006.01)
(Continued)

(52) U.S. Cl.
CPC .................. *B29C 47/666* (2013.01); *B29B 7/42* (2013.01); *B29C 47/38* (2013.01); *B29C 47/385* (2013.01); *B29C 47/585* (2013.01);
(Continued)

(58) Field of Classification Search
CPC .. B29C 47/38; B29C 47/585; B29C 47/6043; B29C 47/66; B29C 47/6018; B29C 47/0009; B29C 47/666; B29C 47/64; B29C 47/385; B29C 47/665; B29B 7/42; B29B 7/425
USPC ............................................................ 366/90
See application file for complete search history.

(56) References Cited

U.S. PATENT DOCUMENTS 3,954,366 A * 5/1976 Fields ............................ 425/208
RE28,901 E * 7/1976 Kim ............................... 425/208
(Continued)

FOREIGN PATENT DOCUMENTS

DE 26 24 589 1/1977
DE 29 43 230 C2 12/1980
(Continued)

*Primary Examiner* — Alison Hindenlang
(74) *Attorney, Agent, or Firm* — Henry M. Feiereisen LLC

(57) ABSTRACT

The invention relates to a single-screw extruder comprising a cylinder (1), which comprises a transition zone (14), and a homogenizing zone (12) that is connected to the transition zone (14), and a screw (2) which is rotatably supported in the cylinder (1) and which has at least two consecutive displacement parts (6, 8) in the homogenizing zone (12), the second displacement part of which in the conveying direction is designed as a shearing part. The aim of the invention is to provide a single-screw extruder which enables an improved melting effect along with an increased throughput, a lowered melt temperature, and an improved pressurization capability. According to the invention, it was recognized that this aim can be achieved in that at least one groove (4) running in the longitudinal direction in the inner cylinder wall is provided in the homogenization zone (12) of the single-screw extruder, and said groove ends in the area between a first displacement part and the subsequent shearing part (8) as viewed in the conveying direction.

17 Claims, 1 Drawing Sheet

(51) Int. Cl.
 *B29C 47/58* (2006.01)
 *B29C 47/60* (2006.01)
 *B29C 47/64* (2006.01)
 *B29B 7/42* (2006.01)
 *B29C 47/62* (2006.01)
 *B29C 47/00* (2006.01)

(52) U.S. Cl.
 CPC ........ *B29C 47/6018* (2013.01); *B29C 47/6043* (2013.01); *B29C 47/6062* (2013.01); *B29C 47/625* (2013.01); *B29C 47/64* (2013.01); *B29C 47/66* (2013.01); *B29C 47/0009* (2013.01)

(56) References Cited

U.S. PATENT DOCUMENTS

| | | | |
|---|---|---|---|
| 4,013,276 A | 3/1977 | Boham et al. | |
| 4,015,832 A | 4/1977 | Kruder | |
| 4,173,417 A | 11/1979 | Kruder | |
| 4,300,840 A * | 11/1981 | Kishihiro | 366/90 |
| 4,405,239 A | 9/1983 | Chung et al. | |
| 4,494,877 A * | 1/1985 | Upmeier et al. | 366/76.93 |
| 4,639,143 A * | 1/1987 | Frankland, Jr. | 366/89 |
| 4,842,788 A | 6/1989 | Johnson | |
| 6,132,076 A * | 10/2000 | Jana et al. | 366/81 |
| 7,083,321 B2 | 8/2006 | Grunschloss | |
| 2002/0131322 A1* | 9/2002 | Grunschloss | 366/80 |
| 2008/0075922 A1 | 3/2008 | Ueda | |
| 2009/0020898 A1* | 1/2009 | Goerlitz et al. | 264/7 |

FOREIGN PATENT DOCUMENTS

| | | |
|---|---|---|
| DE | 199 28 870 C2 | 1/2001 |
| DE | 101 30 759 A1 | 9/2002 |
| GB | 1 550 650 | 8/1979 |
| JP | 2001 322154 | 11/2001 |

\* cited by examiner

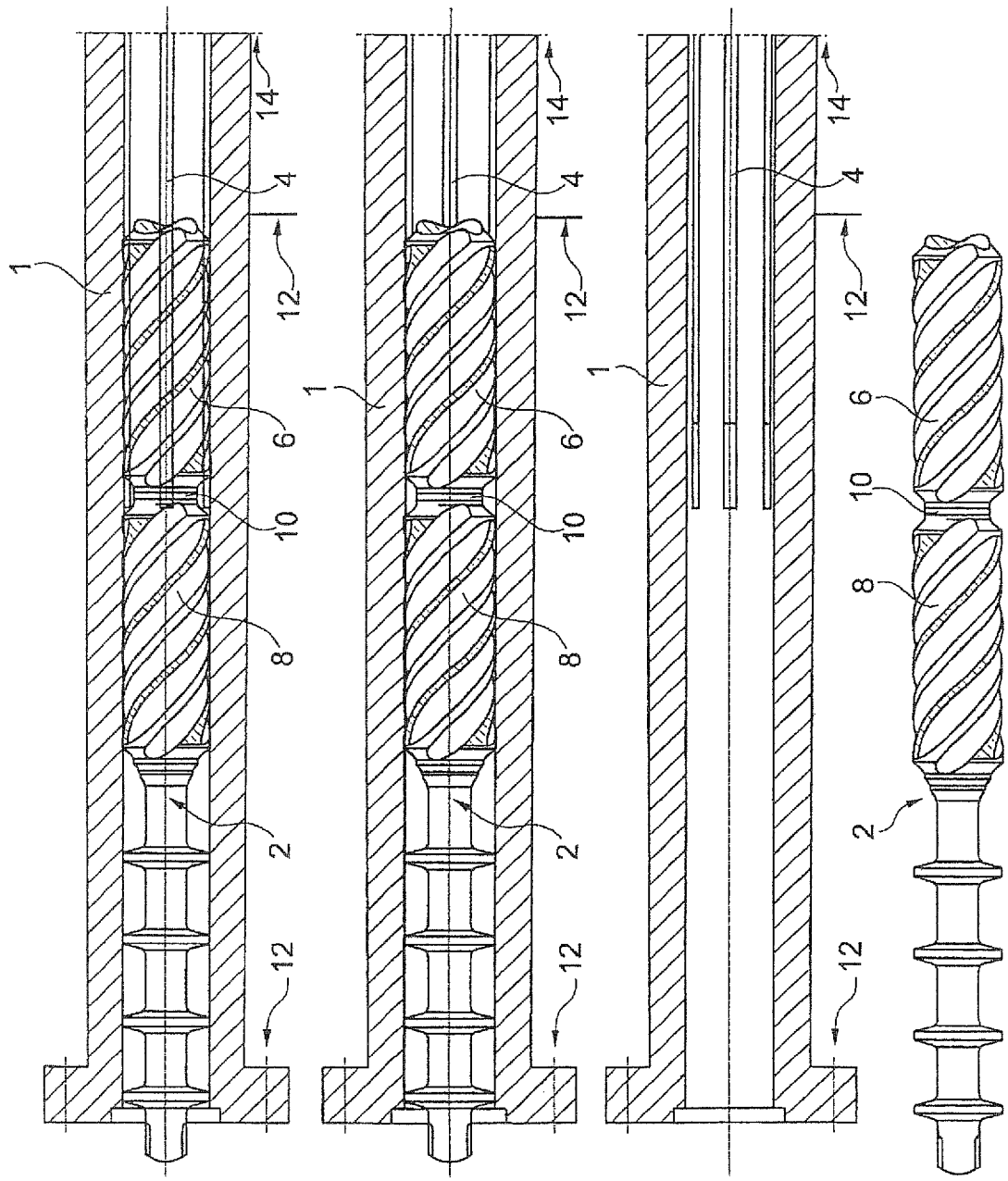

SINGLE SCREW EXTRUDER

CROSS-REFERENCES TO RELATED APPLICATIONS

This application is the U.S. National Stage of International Application No. PCT/EP20091058612, filed Jul. 7, 2009, which designated the United States and has been published as International Publication No. WO 2010/020467 and which claims the priority of German Patent Application, Serial No. 10 2008 038 529.8, filed Aug. 20, 2008, pursuant to 35 U.S.C. 119(a)-(d).

BACKGROUND OF THE INVENTION

The present invention relates to a single screw extruder with a cylinder which has a melting zone and a homogenizing zone, which adjoins the melting zone, and a screw mounted rotatably in the cylinder, which has at least two process sections, following each other, in the region of the homogenizing zone, the second of which in the conveying direction is constructed as a shear section.

In known single screw extruders it is a constant task of the specialist in the art to increase the throughput of the single screw extruder, at the same time maintaining or even improving the quality of the melt.

A variety of developments exist for this, which relate on the one hand to the embodiment of the rotatably mounted screw in the cylinder, so that in the meantime there have been a variety of screw types of different sorts, which are constructed specifically in the various zones of the extruder. Examples of this are barrier screws or polygon screws with cyclic changes to the channel cross-section. Amongst the polygon screws are ET (Energy Transfer) and wave screws, as are described for example in U.S. Pat. No. 4,405,239 or U.S. Pat. No. 4,015,832 and U.S. Pat. No. 4,173,417.

Developments have also been made in the field of the combination of cylinder- and screw configuration. Thus it is known for example from DE 26 24 589 A1 or DE 199 28 870 C2 in a single screw extruder with a screw constructed as a barrier screw in the region of the melting zone, to provide the cylinder with a groove, whereby the throughput of the single screw extruder can be increased.

In addition, it is known from DE 101 30 759 A1 to embody a plasticizing system in a grooved manner also in the region of a homogenizing zone, which has at least two shear sections and a mixing section. An increase to the throughput can be achieved hereby. However, disadvantages also result through the fact that the maddock or barrier shear section are mounted rotatably here in a grooved cylinder section. Residual solid matter remaining in the raw melt can namely become caught in the grooves and can thus pass over the cross-pieces of the shear section. This effect is also designated as the static drainage effect or ice cube effect. By the passage of the residual solid matter into the melt in adjacent channels of the shear section, the residual solid matter can in fact be well heated on the one hand and at the same time the surrounding melt can be cooled, but on the other hand the danger also exists that non-melted residual solid matter leaves the extruder with the melt and thus impairs the quality of the melt. The shear section therefore can not fulfil its actual task, namely to retain residual solid matter contained in the raw melt and to plasticize this under the effect of moderate shear deformation in the shear gap between cross-pieces of the shear section and the inner wall of the cylinder. In addition, depending on the state of preparation of the raw melt, shear sections can be large pressure consumers.

SUMMARY OF THE INVENTION

It is therefore an object of the present invention to provide a single screw extruder which makes possible an improved melting effect, in particular an improved residual melting effect with, at the same time, an increased throughput, reduced melt temperature and improved capability of pressure build-up.

This problem is solved by a single screw extruder having a cylinder which has a melting zone and a homogenizing zone, which adjoins the melting zone, and a screw mounted rotatably in the cylinder, which screw has at least two successive process sections in the region of the homogenizing zone, of which the one following in the conveying direction is constructed as a shear section, with at least one groove, running in the longitudinal direction, being provided in the inner wall of the cylinder in the homogenizing zone which, viewed in the conveying direction, ends in the region between the first process section and the following shear section.

According to the invention, it was discovered that the said disadvantages can be circumvented if in the homogenizing zone of the single screw extruder at least one groove is provided running in the longitudinal section in the inner wall of the cylinder, which groove, viewed in the conveying direction, ends in the region between a first and a subsequent, in particular the second, process section. Therefore, according to the invention the entire homogenizing zone is not provided with at least one groove, but rather only the region between the start of the homogenizing zone, subsequent to the melting zone, and the region between the first and a subsequent process section which is constructed as a shear section. The process elements are provided here in the homogenizing zone as screw elements. In the region of the homogenizing zone, the screw can also have more than two successive process sections, however according to the invention it is important that precisely the process section lying in the conveying direction is constructed as a shear section which is mounted in a groove-free region of the cylinder. Thus, it can be ensured that this process section can fulfil the task of a shear section, i.e. in particular can act in a separating manner and can plasticize any residual solid matter which may still be present in the raw melt by shear deformation in the shear gap.

In this embodiment it has proved to be advantageous that by the provision of at least one groove in the region of the first process section, owing to the so-called static drainage effect through the grooves a better conveying and a smaller pressure loss take place. Existing residual solid matter can become caught in the groove or grooves, is diverted through the grooves into adjacent channels of the process section and through this and the close contact with the heated cylinder wall it is heated in a particular effective manner. The size of existing islands of residual solid matter can thus be further reduced. By the improved plasticizing or heating of the raw melt which is able to be achieved owing to the groove or grooves in the region of the first process section, the melt can be passed in a better state of preparation to the subsequent, in particular second process section, which is constructed according to the invention as a shear section. In this sense, better means that remaining islands of residual solid matter are smaller and are heated better. Thereby, the deformation resistance of the residual solid matter is reduced and as a result the pressure loss in the second process section.

Through the fact that in the region of the subsequent process section no groove or grooves are provided, the shear section can come fully into effect here by making provision that residual solid matter which is still contained is retained by the cross-pieces of the shear section and is plasticized owing to shear deformations in the shear gap, i.e. in the gap between cross-pieces of the shear section and the inner wall of the cylinder. As there are no grooves here in the inner wall of the cylinder, no residual solid matter can penetrate between the inner wall of the cylinder and the cross-pieces of the shear section, whereby an improved homogenizing effect can be achieved. Thus, through the embodiment of the single screw extruder according to the invention, a secure residual plasticizing of any residual solid matter which is still present can be guaranteed with, at the same time, a lower pressure loss of the system because in the region of the first process section the groove or grooves contribute to a better heating of residual solid matter and a reduction of remaining islands of residual matter. Therefore, through the single screw extruder according to the invention a system can be provided with, as a whole, a small pressure loss and a both thermally and mechanically improved homogenizing of the melt.

According to a preferred further development of the present invention, the single screw extruder according to the invention can have at least one groove, running in longitudinal direction, in the inner wall of the cylinder in the region of the melting zone. In this region also the already known effect of the improved melting of residual solid matter can be utilized advantageously. Particularly preferably here the at least one groove in the melting zone can continue without a transitional stage into the at least one groove in the homogenizing zone. However, provision may also be made that in the region of the melting zone more or fewer grooves are provided than in the region of the homogenizing zone.

According to a further preferred embodiment of the single screw extruder according to the invention, at least one groove, running in longitudinal direction, can also be provided in the inner wall of the cylinder in the region of the feed zone. By the provision of grooves in the feed zone, the solid matter feed and the solid matter conveying can be greatly improved. This effect can be advantageously combined with the improved melting behaviour in the melting zone and the improved homogenizing behaviour in the homogenizing zone. Preferably, the at least one groove in the region of the feed zone can also in particular continue without a transitional stage into at least one groove in the melting zone, but here also in turn more or fewer grooves can be provided in the feed zone than in the melting zone. Particularly preferably, both the feed and melting and also homogenizing zones have the same number of grooves, which makes possible a particularly simple provision of a corresponding single screw extruder. Advantages result here in particular when the cylinder is embodied in one piece. Alternatively, the various zones may, however, also be composed of different cylinder sections which can be respectively provided separately with grooves.

According to a particularly preferred embodiment, the at least one groove can run in a spiral shape in the region of the first process section in the conveying direction in the homogenizing zone. Here, various pitch angles of the groove can be provided and in particular the direction of rotation of the groove can be selected contrary to the direction of rotation of a screw which is acting in a conveying manner. Likewise, the grooves in the melting and feed zones, if present, can be constructed in a spiral shape.

According to a further preferred embodiment of the present invention, the single screw extruder can have several grooves spaced apart over the periphery of the cylinder. This provides particularly favourable results with regard to conveying behaviour and the build-up of pressure.

According to a preferred embodiment of the present invention, the depth and/or the width of the groove or grooves can vary. Thus, preferably a groove will taper off in the conveying direction, i.e. will decrease in depth and will adapt itself substantially to the inner wall of the cylinder. Thus, undesired dead zones in which the melt remains and degrades can be effectively avoided.

Particularly preferably, the grooves in the inner wall of the cylinder in the homogenizing zone taper off in the region between the first and a subsequent process section such that their depth decreases substantially to zero, so that it can be ensured that there is no overlap between the grooves and the cross-pieces of the subsequent process section which is constructed as a shear section, in which the drainage effect which has been referred to could occur. The latter is to be avoided according to the invention in the region of the subsequent process section, in order to be able to ensure the desired thermal and mechanical homogenizing of the melt. In particular, the depth of the groove or grooves in the homogenizing zone can decrease over the first process section such that the depth decreases continuously to zero and hence also the drainage effect decreases over the first process section. Also in the case of the presence of grooves already in the region of the melting zone, these can be constructed flatter in the homogenizing zone, in order to thus influence the drainage effect.

According to an advantageous embodiment, the first process section in the conveying direction in the homogenizing zone is constructed as a shear section. Hereby, a first homogenizing of the raw melt with any residual solids which may be present can already be brought about, whilst by the simultaneous presence of the groove or grooves the drainage effect still occurs and islands of residual solid matter are, at the same time, effectively distributed and heated.

Particularly preferably, the first shear section in the conveying direction can have a larger overflow gap in this embodiment. An overflow gap is understood here to mean the gap present between an overflow cross-piece of the shear section and the inner wall of the cylinder. Hereby, the pressure loss on this shear section can be reduced, which has a positive effect on the pressure loss over the entire screw in the single screw extruder according to the invention. In addition, hereby in the interaction with the groove in the inner wall of the cylinder in this region the heating can be further improved and the melt can be mixed optimally with the islands of residual solid matter.

According to the invention, the first shear section in the conveying direction can also have cross-piece openings, whereby the single screw extruder can be adapted even better to the most varied of process tasks. Here, the design will proceed from the corresponding quotas of residual solid matter islands and their size, according to the material which is processed.

According to a further preferred embodiment of the single screw extruder according to the invention, the first process section in the conveying direction can also be constructed as a mixing section. Here, depending on the processed material, use is made of the fact that mixing parts have a greater distributing effect, whereby residues of solid matter distribute themselves better in the otherwise already melted material in the melting zone. In addition, preferably a mixing section can be used here with a conveying action, whereby the pressure loss can be further reduced via the single screw extruder according to the invention. Thus, particularly preferably a faceted mixing section, acting in a conveying manner, can be used as first process section in the homogenizing zone, which advantageously cooperates with the groove or grooves in this region.

The choice of the shear sections both for the first process section in the conveying direction and also for the subsequent process section in the conveying direction can take place from the assemblage of Le Roy shear sections, Maddock shear sections and/or Gregory shear sections. These can be used here in any desired combination, this being geared to the materials which are to be processed and the corresponding process tasks. Thus also in the case of the embodiment of the first process section, all the named shear sections can be used alternatively as mixing section in the region of the subsequent, in particular second process section. In addition, following the second process section in the conveying direction, a further process section can also be provided. The latter can again be constructed as a shear section. Particularly preferably however, mixing sections are provided here, which make possible an optimum mixing of the material which is melted without residue by the second process section in the homogenizing zone and thus deliver a melt having great homogeneity, both with regard to temperature and also to material composition, to the outlet end of the single screw extruder. These mixing sections can be acting in a conveying manner here, or can be neutral.

According to a further preferred embodiment of the present invention, the screw can be constructed in the region of the melting zone in particular as a multi-start, conventional screw conveyor or as barrier screw or as polygon screw (ET screw or wave screw). By the corresponding choice of the screw in the region of the melting zone, it can be ensured that the material characteristics of the material which is to be processed are taken into account optimally and a best possible melting performance is guaranteed, in order to then homogenize in the best possible manner the material, melted to the greatest part, in the region of the homogenizing zone by the embodiment of the extruder according to the invention. Here, the inner wall of the cylinder can also be constructed so as to be grooved in the region of the melting zone.

Through the present invention, an excellent product quality can thus be achieved. At the same time, the overall melting performance of the single screw extruder according to the invention is very high, whereby a high overall throughput is made possible, with the pressure level in the cylinder being kept low, which leads to an extension of the lifespan of the components of the single screw extruder. By the reduction of the pressure level, the stress on the individual parts and on the surfaces both of the screw and also of the cylinder is reduced, and signs of wear only occur after lengthy use.

BRIEF DESCRIPTION OF THE DRAWING

A preferred embodiment of the present invention is to be described in further detail with the aid of the following figures, in which are shown:

FIG. 1a diagrammatically, a section through the homogenizing zone and a region of the melting zone of a single screw extruder according to the invention with screw, illustrated broken open, held therein, and grooves in the inner wall of the cylinder, FIG. 1b the same view with the screw illustrated solid, FIG. 1c the same cylinder section without the screw held therein and FIG. 2 the end, on the conveying direction side, of a screw which is able to be used in an extruder according to the invention.

DETAILED DESCRIPTION OF PREFERRED EMBODIMENTS

In FIG. 1a a section of a cylinder 1 of a single screw extruder according to the invention is illustrated diagrammatically in section, wherein the homogenizing zone 12 and a region of the melting zone 14 are illustrated. A section of a screw 2 is contained in the cylinder 1, the end of which screw on the conveying direction side is on the left-hand side in the figure and continues towards the right into the melting region, but is illustrated here in broken form. The screw is illustrated in broken form so that one can see through it onto the inner wall of the cylinder. The inner wall of the cylinder is provided with grooves 4 which run in the figure in longitudinal direction and in the present case are situated both in a region of the homogenizing zone 12 and also in the melting zone 14, wherein they extend from the region of the homogenizing zone 12, without a transitional stage, into the melting zone 14. In the homogenizing zone 12, the grooves 4 end in the region between a first trailing process section 6 and a second leading process section 8. Here, they are illustrated ending abruptly, but they can also run gradually towards zero, in order to avoid any possible dead zones for the melt.

In the illustrated example embodiment, the two successive process sections 6 and 8 in the homogenizing zone 12 are constructed as shear sections, here as spiral shear sections. These have various channels which are respectively formed by cross-pieces. The two process sections 6 and 8 are separated from each other by a recess 10; precisely in this region, before the second process section 8 begins, the grooves 4 in the inner wall of the cylinder 1 end according to the invention. Adjoining the second process section 8 in the conveying direction is a screw region which here, illustrated diagrammatically, is constructed as a toothed wheel mixing section.

In FIG. 1b the same view is illustrated as in FIG. 1a; the same reference numbers are used for identical features. Here, the screw 2 is simply not illustrated in broken form.

In FIG. 1c the same cylinder 1 is shown once again without screw 2. It is clear from this that the grooves 4 taper off towards the region between the first and second process section. This is only illustrated diagrammatically.

In FIG. 2 the front partial region of the screw 2, viewed in conveying direction, is illustrated, as has already been described above in connection with FIGS. 1a to 1c. The cross-pieces of the process sections 6 and 8, illustrated with hatching, constructed here as spiral shear sections, are the so-called overflow cross-pieces, which according to the invention can be constructed lower in the case of the first process section 6 than in the case of the second process section 8, so that in the case of the first shear section there is a larger overflow gap, that is the gap between overflow cross-piece and inner wall of the cylinder.

In operation, the material which is processed with the single screw extruder is conveyed from right to left by the rotary movement of the screw 2 in the cylinder 1, and in so doing is melted. The grooves 4, already provided in the melting zone 14, according to the embodiment which is shown, cause residual solids, which are respectively not yet melted, which occur in small islands or clumps, to be able to become caught in the grooves and, owing to the pressure which is built up, to pass over the corresponding cross-piece of the screw 2 and land in an adjacent screw channel or respectively a different place of the same screw channel. As generally the bulk of the material is already present there as melt, the residual solid matter can be melted better by the contact with the melt surrounding it, the temperature of which slightly decreases thereby. Likewise, the contact of the residual solid matter with the heated inner wall of the cylinder whilst staying in the groove also contributes further to the heating thereof. Thus, by the provision of grooves, through a kind of static drainage effect, which is also designated as ice cube effect, the material can be melted better, with the grooves also additionally having a positive effect on the axial conveying of the material in the cylinder. Hereby, in addition the capability of pressure build-up of the corresponding single screw extruder is strengthened.

By the provision according to the invention of grooves in the homogenizing zone 12 in the region of the first process section 6, with the grooves 4 ending between the first process section 6 and the second process section 8, this effect can also be used in addition in the region of the first process section 6 constructed here as a shear section. This has a further positive effect on the residual plasticizing of residual solid matter which is still present in the raw melt at the end of the melting zone 14. This is effectively heated by the static drainage effect, which can be further strengthened by the slight enlargement of the overflow gap in this region. As the grooves are additionally active in a conveying manner, no very high pressure loss occurs via the first process section 6. In addition, through the more effective heating, the material has a lower viscosity, whereby the pressure loss is further reduced via the following process section, which is constructed as a shear section.

By the use of a single screw extruder according to the invention, a particularly good thermal and mechanical homogenizing of the produced melt can be ensured.

The invention claimed is:

1. A single screw extruder, comprising:
   a cylinder including a melting zone and a homogenizing zone, which adjoins the melting zone, said cylinder having an inner wall formed in the homogenizing zone with a first longitudinal groove; and
   a screw mounted rotatably in the cylinder and having in a region of the homogenizing zone at least two successive process sections as viewed in a conveying direction, wherein at least one of the process sections is constructed as a shear section,
   wherein the first groove ends in the conveying direction in a region between the successive process sections of the homogenizing zone.

2. The single screw extruder of claim 1, wherein the inner wall of the cylinder includes in the region of the melting zone a second longitudinal groove which merges with the first groove in the homogenizing zone.

3. The single screw extruder of claim 2, wherein the second groove merges smoothly with the first groove.

4. The single screw extruder of claim 2, wherein the cylinder includes a feed zone for entry of material, said inner wall of the cylinder having in a region of the feed zone a third longitudinal groove which merges with the second groove in the melting zone.

5. The single screw extruder of claim 4, wherein the third groove merges smoothly with the second groove.

6. The single screw extruder of claim 4, wherein the first, second and third grooves have each a spiral shape.

7. The single screw extruder of claim 4, further comprising a plurality of each said first, second and third grooves respectively arranged in spaced-apart relationship about a periphery of the cylinder.

8. The single screw extruder of claim 7, wherein the first, second and third grooves have varying depth and/or width.

9. The single screw extruder of claim 1, wherein at least one of the successive process sections is constructed as a shear section.

10. The single screw extruder of claim 1, wherein at least one of the successive process sections has a greater overflow gap.

11. The single screw extruder of claim 9, wherein the shear sections forming the at least one of the successive process sections are selected from the group consisting of Le Roy shear section, Maddock shear section, Gregory shear section, and any combination thereof.

12. The single screw extruder of claim 1, wherein at least one of the successive process sections has cross-piece openings.

13. The single screw extruder of claim 1, wherein at least one of the successive process sections is constructed as a mixing section.

14. The single screw extruder of claim 13, wherein the mixing section is a faceted mixing section.

15. The single screw extruder of claim 1, wherein the screw is constructed in the region of the melting zone as a member selected from the group consisting of screw conveyor, barrier screw, and polygon screw.

16. The single screw extruder of claim 15, wherein the member is a multi-start screw.

17. The single screw extruder of claim 1, wherein the screw is an energy transfer screw or a wave screw.

* * * * *